US012666030B2

(12) United States Patent
Pettersson et al.

(10) Patent No.: US 12,666,030 B2
(45) Date of Patent: Jun. 23, 2026

(54) ENHANCED SKIP FRAME ENCODING ASSOCIATED WITH A HIERARCHICAL PREDICTION PATTERN

(71) Applicant: Axis AB, Lund (SE)

(72) Inventors: Mattias Pettersson, Lund (SE); Johan Palmaeus, Lund (SE)

(73) Assignee: AXIS AB, Lund (SE)

( * ) Notice: Subject to any disclaimer, the term of this patent is extended or adjusted under 35 U.S.C. 154(b) by 17 days.

(21) Appl. No.: 18/984,281

(22) Filed: Dec. 17, 2024

(65) Prior Publication Data

US 2026/0172569 A1      Jun. 18, 2026

(51) Int. Cl.
| | |
|---|---|
| *H04N 19/132* | (2014.01) |
| *H04N 19/172* | (2014.01) |
| *H04N 19/177* | (2014.01) |
| *H04N 19/31* | (2014.01) |

(52) U.S. Cl.
CPC ......... *H04N 19/132* (2014.11); *H04N 19/172* (2014.11); *H04N 19/177* (2014.11); *H04N 19/31* (2014.11)

(58) Field of Classification Search
CPC .. H04N 19/132; H04N 19/172; H04N 19/177; H04N 19/31
USPC ...................................................... 375/240.12
See application file for complete search history.

(56) References Cited

U.S. PATENT DOCUMENTS

| | | | |
|---|---|---|---|
| 5,689,307 | A | 11/1997 | Sugahara et al. |
| 8,687,707 | B2 | 4/2014 | Han |
| 11,457,228 | B2 | 9/2022 | Edpalm |
| 2007/0171972 | A1 | 7/2007 | Tian et al. |
| 2011/0255594 | A1* | 10/2011 | Nagori ................. H04N 19/126 |
| | | | 375/240.03 |
| 2016/0366414 | A1 | 12/2016 | Zhang et al. |
| 2021/0092412 | A1* | 3/2021 | Edpalm .................. H04N 19/31 |
| 2021/0203946 | A1* | 7/2021 | Sethuraman ........... H04N 19/70 |
| 2025/0184500 | A1* | 6/2025 | Hassbring .......... H04N 21/8451 |

FOREIGN PATENT DOCUMENTS

| | | |
|---|---|---|
| CN | 107396121 B | 11/2019 |

* cited by examiner

*Primary Examiner* — Asmamaw G Tarko
(74) *Attorney, Agent, or Firm* — XSENSUS LLP

(57) ABSTRACT

In some implementations, a device may encode a series of images of video data into an encoded video stream including key frames and delta frames. The delta frames may be arranged according to a hierarchical prediction pattern with multiple temporal layers and a predetermined structure. The device may obtain an instruction to encode a delta frame as a skip frame. The device may determine that the skip frame is to be encoded in a first temporal layer, of the multiple temporal layers, according to the predetermined structure. The device may evaluate whether an immediately preceding frame to the skip frame is encoded, or to be encoded, in a second temporal layer, of the multiple temporal layers, that is finer than the first temporal layer. The device may perform an action based on the evaluation.

20 Claims, 12 Drawing Sheets

100 ➞

100 ➞

100

Video data

Video Encoder
105

Encode a series of images of video data into an encoded video stream including key frames and delta frames Instruction to encode a delta frame as a skip frame Video Encoder
105

100

100

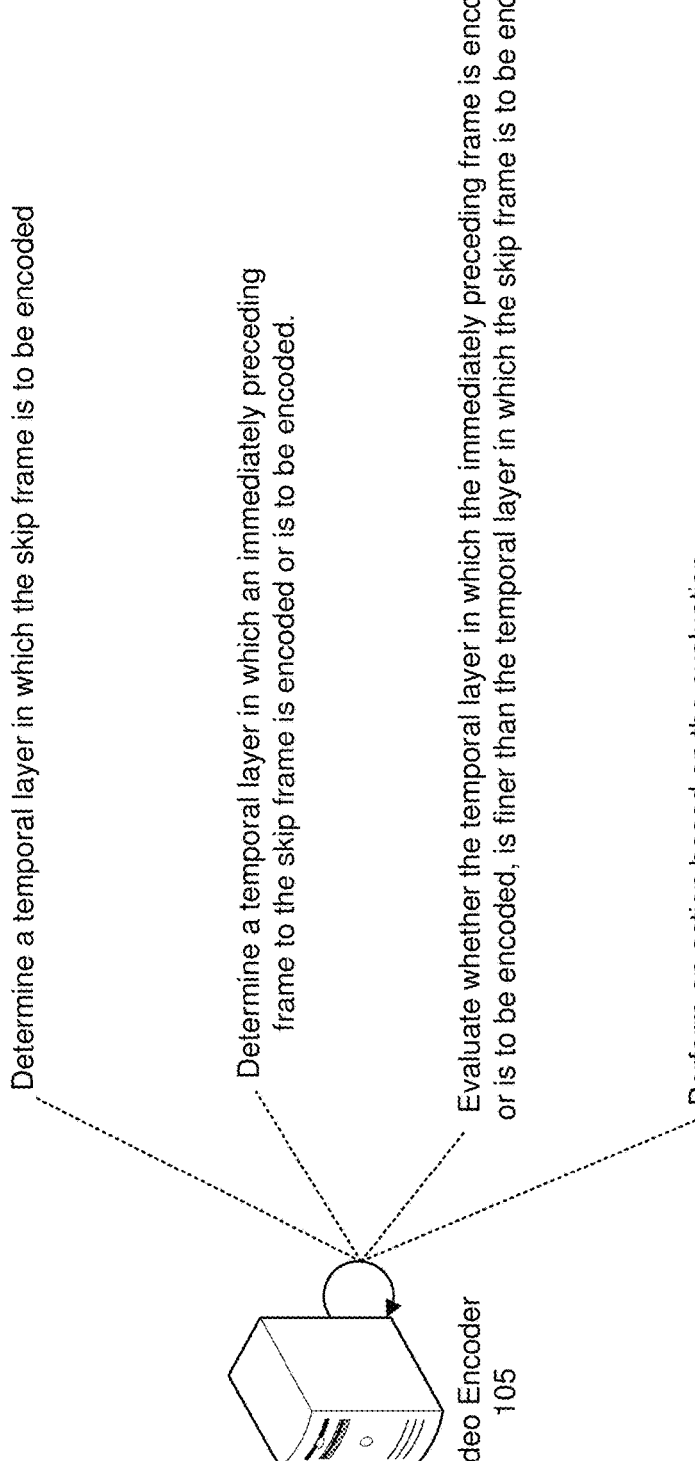

Determine a temporal layer in which the skip frame is to be encoded

Determine a temporal layer in which an immediately preceding frame to the skip frame is encoded or is to be encoded.

Evaluate whether the temporal layer in which the immediately preceding frame is encoded, or is to be encoded, is finer than the temporal layer in which the skip frame is to be encoded Perform an action based on the evaluation Video Encoder
105

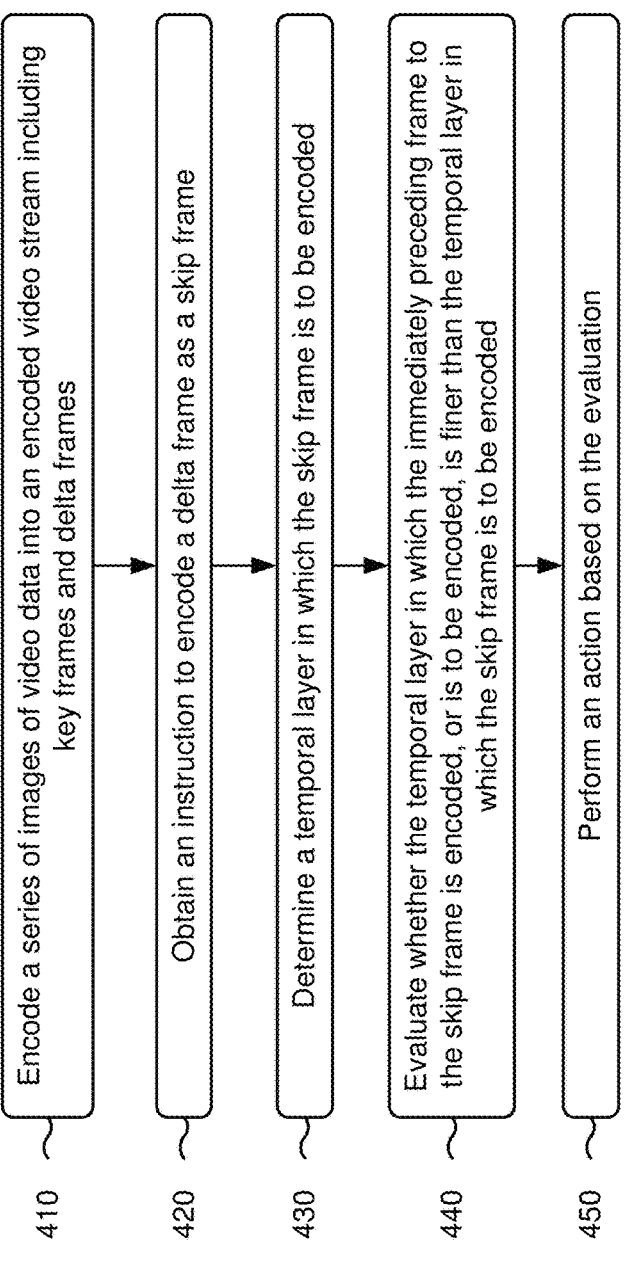

410 Encode a series of images of video data into an encoded video stream including key frames and delta frames 420 Obtain an instruction to encode a delta frame as a skip frame 430 Determine a temporal layer in which the skip frame is to be encoded 440 Evaluate whether the temporal layer in which the immediately preceding frame to the skip frame is encoded, or is to be encoded, is finer than the temporal layer in which the skip frame is to be encoded 450 Perform an action based on the evaluation

ENHANCED SKIP FRAME ENCODING ASSOCIATED WITH A HIERARCHICAL PREDICTION PATTERN

BACKGROUND

Video encoding techniques are used to compress video data, reducing an amount of storage space and bandwidth required while preserving visual quality and ensuring smooth playback. By eliminating redundant information and efficiently representing motion and texture, video encoding allows for the transmission of high-quality video over a wide range of networks, including bandwidth-constrained environments.

SUMMARY

Some implementations described herein relate to a video encoding method, comprising: encoding a series of images of video data into an encoded video stream including key frames and delta frames, wherein the delta frames are arranged according to a hierarchical prediction pattern with multiple temporal layers and a predetermined structure, and wherein the hierarchical prediction pattern defines a display order for the key frames and delta frames; obtaining an instruction to encode a delta frame as a skip frame to lower a bit rate of the encoded video stream and maintain a frames per second (FPS) value of the encoded video stream; determining that the skip frame is to be encoded in a first temporal layer, of the multiple temporal layers, according to the predetermined structure; evaluating, based on the display order, whether an immediately preceding frame to the skip frame is encoded, or to be encoded, in a second temporal layer, of the multiple temporal layers, that is finer than the first temporal layer; based on the second temporal layer being finer than the first temporal layer, modifying the predetermined structure by encoding the immediately preceding frame as a new delta frame in the first temporal layer, and encoding the skip frame with reference to the new delta frame in the first temporal layer; and based on the second temporal layer not being finer than the first temporal layer, encoding the skip frame with reference to the immediately preceding frame.

Some implementations described herein relate to a device, comprising: one or more memories; and one or more processors, communicably coupled to the one or more memories, configured to: encode a series of images of video data into an encoded video stream including key frames and delta frames, wherein the delta frames are arranged according to a hierarchical prediction pattern with multiple temporal layers and a predetermined structure, and wherein the hierarchical prediction pattern defines a display order for the key frames and delta frames; obtain an instruction to encode a delta frame as a skip frame to lower a bit rate of the encoded video stream and maintain a frames per second (FPS) value of the encoded video stream; determine that the skip frame is to be encoded in a first temporal layer, of the multiple temporal layers, according to the predetermined structure; evaluate, based on the display order, whether an immediately preceding frame to the skip frame is encoded, or to be encoded, in a second temporal layer, of the multiple temporal layers, that is finer than the first temporal layer; based on the second temporal layer being finer than the first temporal layer, modify the predetermined structure by encoding the immediately preceding frame as a new delta frame in the first temporal layer, and encode the skip frame with reference to the new delta frame in the first temporal layer; and based on the second temporal layer not being finer than the first temporal layer, encode the skip frame with reference to the immediately preceding frame.

Some implementations described herein relate to a non-transitory computer-readable medium storing a set of instructions, the set of instructions including: one or more instructions that, when executed by one or more processors of a device, cause the device to: encode a series of images of video data into an encoded video stream including key frames and delta frames, wherein the delta frames are arranged according to a hierarchical prediction pattern with multiple temporal layers and a predetermined structure, and wherein the hierarchical prediction pattern defines a display order for the key frames and delta frames; obtain an instruction to encode a delta frame as a skip frame to lower a bit rate of the encoded video stream and maintain a frames per second (FPS) value of the encoded video stream; determine that the skip frame is to be encoded in a first temporal layer, of the multiple temporal layers, according to the predetermined structure; evaluate, based on the display order, whether an immediately preceding frame to the skip frame is encoded, or to be encoded, in a second temporal layer, of the multiple temporal layers, that is finer than the first temporal layer; based on the second temporal layer being finer than the first temporal layer, modify the predetermined structure by encoding the immediately preceding frame as a new delta frame in the first temporal layer, and encode the skip frame with reference to the new delta frame in the first temporal layer; and based on the second temporal layer not being finer than the first temporal layer, encode the skip frame with reference to the immediately preceding frame.

BRIEF DESCRIPTION OF THE DRAWINGS

FIGS. 1A-1I are diagrams of an example associated with enhanced video encoding.

FIG. 4 is a flowchart of an example process associated with enhanced video encoding.

DETAILED DESCRIPTION

Figure 1A:
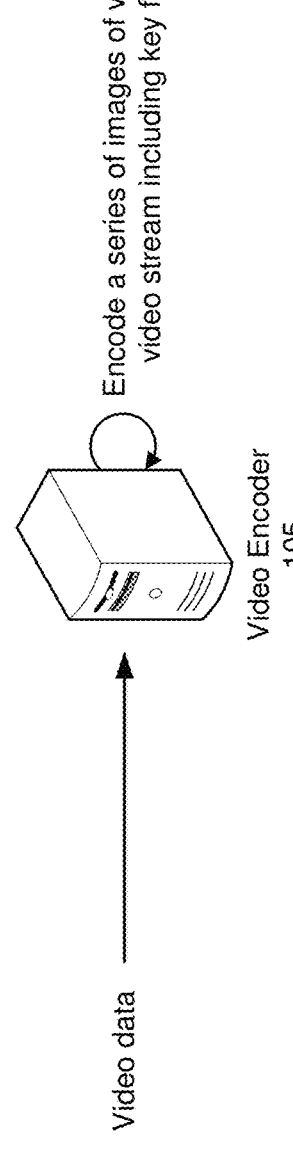

The following detailed description of example implementations refers to the accompanying drawings. The same reference numbers in different drawings may identify the same or similar elements.

Predictive video encoding techniques utilize hierarchical prediction patterns to compress video data efficiently while preserving visual quality. These patterns organize video frames into a hierarchical structure of temporal layers, where each layer defines how frames reference one another for prediction. Frames in coarser temporal layers serve as references for frames in finer temporal layers, enabling more effective motion prediction and compression. Coarser layers do not depend on finer layers, ensuring a stable foundation for prediction dependencies.

A typical group of pictures (GOP) arranged in a hierarchical prediction pattern includes a key frame, also known as an intra-coded frame (I-frame), followed by delta frames (e.g., predictive frames (P-frames), and/or bi-predictive frames (B-frames) distributed across multiple temporal layers. In some implementations, the GOP arranged in the hierarchical prediction pattern may include another type of inter-frame, such as an inter-refresh frame (e.g., which may also be referred to as a fast-forward frame, an F-frame, a refresh frame, and/or an R-frame). Different from a P-frame, which references a nearest preceding decoded P-frame as a reference image frame, the inter-refresh frame may reference (e.g., or refer back to) a nearest preceding intra-frame (e.g., I-frame) rather than referencing the nearest preceding decoded P-frame. In other words, an inter-refresh frame may be a P-frame that references (e.g., directly references) the I-frame of the GOP.

This structure enables enhanced compression efficiency, scalability, and adaptability to various bandwidth and resource constraints.

To reduce a bit rate of an encoded video stream, one approach is to lower a frame rate (e.g., a frames per second (FPS) value) by dropping frames; however, this can disrupt playback in systems requiring a fixed FPS. Alternatively, delta frames may be replaced by skip frames (or empty frames) to reduce the bit rate and maintain the FPS value. Skip frames are encoded with minimal data, referencing a previous frame and signaling that no motion or residual changes have occurred.

Replacing delta frames with skip frames in a hierarchical prediction pattern, however, can introduce temporal inconsistencies. If intermediate frames in finer temporal layers are displayed after the referenced frame but before the skip frame, it can create the appearance of a "jump back" in time. These inconsistencies can propagate across multiple frames, potentially degrading playback smoothness and visual coherence.

Some implementations described herein provided enhanced video encoding (e.g., enhanced skip frame encoding associated with a hierarchical prediction pattern). For example, a device (e.g., a video encoder) may encode a series of images of video data into an encoded video stream including key frames and delta frames. The delta frames may be arranged according to a hierarchical prediction pattern with multiple temporal layers and a predetermined structure. The hierarchical prediction pattern may define a display order for the key frames and delta frames.

The device may obtain an instruction to encode a delta frame as a skip frame (e.g., to lower a bit rate of the encoded video stream and maintain a frames per second (FPS) value of the encoded video stream). The device may determine a temporal layer in which the skip frame is to be encoded (e.g., a first temporal layer, of the multiple temporal layers, according to the predetermined structure). The device may determine a temporal layer in which an immediately preceding frame to the skip frame is encoded, or is to be encoded (e.g., a second temporal layer). The device may evaluate, based on the display order, whether the temporal layer in which the immediately preceding frame is encoded, or is to be encoded, is finer than the temporal layer in which the skip frame is to be encoded. The device may perform an action based on the evaluation, as described in more detail elsewhere herein.

As an example, and based on the temporal layer in which the immediately preceding frame is encoded, or is to be encoded, being finer than the temporal layer in which the skip frame is to be encoded, the device may modify the predetermined structure by encoding the immediately preceding frame as a new delta frame in a temporal layer that is at least as coarse as the temporal layer in which the skip frame is to be encoded and may encode the skip frame with reference to the new delta frame (e.g., in the temporal layer that is at least as coarse as the temporal layer in which the skip frame is to be encoded).

As another example, and based on the temporal layer in which the immediately preceding frame is encoded, or is to be encoded, not being finer than the temporal layer in which the skip frame is to be encoded, the device may encode the skip frame with reference to the immediately preceding frame to the skip frame, which is located in a temporal layer that is at least as coarse as the temporal layer in which the skip frame is encoded (e.g., without deviating from the predetermined structure).

Accordingly, a device which encodes video data according to a hierarchical prediction pattern having multiple temporal layers and a predetermined structure (e.g., an IPBBPBBP structure, among other examples) may deviate from the predetermined structure if an immediately preceding frame to a skip frame to be encoded is located in a finer temporal layer than a temporal layer in which the skip frame is to be encoded. Additionally, if the immediately preceding frame to the skip frame to be encoded is located in a temporal layer that is at least as coarse as a temporal layer in which the skip frame is to be encoded, the device may perform encoding according to the predetermined structure. In this way, the device may replace delta frames with skip frames to lower a bit rate of an encoded video stream without affecting an FPS value of the encoded video stream and without creating jump back occurrences.

FIGS. 1A-H are diagrams of an example 100 associated with enhanced video encoding (e.g., enhanced skip frame encoding associated with a hierarchical prediction pattern). As shown in FIGS. 1A-1I, the example 100 includes a video encoder 105 (e.g., a video encoder device), which is described in more detail in connection with FIGS. 2 and 3.

As shown in FIG. 1A the video encoder 105 may obtain video data. In some implementations, the video encoder 105 may obtain the video data from an imaging sensor, such as an imaging sensor associated with a surveillance system. Although the video encoder 105 is described herein as receiving the video data from the video source, the video encoder 105 may receive the video data in any suitable manner.

As further shown in FIG. 1A, the video encoder 105 may encode a series of images of video data into an encoded video stream including key frames and delta frames. In some implementations, the delta frames may be arranged according to a hierarchical prediction pattern with multiple temporal layers and a predetermined structure. The hierarchical prediction pattern may define a display order for the key frames and delta frame.

In some implementations, the predetermined structure may be a group of pictures (GOP) structure that utilizes at least one of a dyadic prediction structure, a non-dyadic prediction structure, or a hierarchical prediction structure with a zero encoder/decoder delay. A dyadic prediction structure is a hierarchical video encoding pattern in which frames are organized in a binary tree-like structure, with each frame (other than the key frame) referencing exactly two other frames (e.g., a temporally previous frame and a temporally subsequent frame). The dyadic prediction structure distributes frames across multiple temporal layers, where coarser layers provide reference frames for finer layers, enabling high compression efficiency and temporal scalability.

A non-dyadic prediction structure is a hierarchical prediction structure that enables frames to reference multiple other frames without strict adherence to a dyadic pattern. This flexibility accommodates irregular motion and complex prediction dependencies, making it suitable for scenarios requiring adaptive frame referencing or encoding irregularities. A prediction structure with zero encoder/decoder delay is a hierarchical prediction pattern where frames are encoded and decoded in sequential order without relying on future frame references. By eliminating a need for bidirectional prediction (e.g., B-frames), this structure minimizes buffering requirements and latency, making it suitable for real-time applications, such as video conferencing or live streaming.

In some implementations, the encoded video stream may be associated with a bit rate and an FPS value. The video encoder 105 may replace delta frames with skip frames to reduce the bit rate of the encoded video stream without affecting the FPS value (e.g., the FPS value is maintained), as described in more detail elsewhere herein.

Figure 1B:

As shown in FIG. 1B, the video encoder 105 may obtain an instruction to encode a delta frame as a skip frame (e.g., to lower the bit rate and maintain the FPS value of the encoded video stream). In some implementations, the instruction may be associated with a command (e.g., a force skipframe command) that instructs the video encoder 105 to replace a delta frame (e.g., an upcoming delta frame or an encoded but not yet transmitted delta frame, among other examples) with a skip frame (e.g., to reduce the bit rate and maintain the FPS value of the encoded video stream). As an example, the force skipframe command may instruct the video encoder 105 to replace a B-frame with a skip frame if the video encoder 105 is using a GOP structure where higher level B-frames refer to fewer higher quality B-frames in a lower level (e.g., which is a type of default behavior utilized by an FFmpeg encoder configured for H.264 encoding), among other examples. The force skipframe command may include a frame identifier, a frame type, a reason (e.g., no motion detected), a target bit rate, and/or a target FPS value, among other examples.

Additionally, or alternatively, the instruction may be associated with at least one of a decoding requirement of maintaining a fixed frame display interval (e.g., associated with playback systems utilizing fixed frame intervals), an available bandwidth (e.g., associated with adapting to reduced bandwidth during video streaming by replacing motion data with skip frames), a network condition (e.g., associated with handling packet loss or latency in a video stream by reducing bit rate with skip frames), an available storage capacity (e.g., associated with conserving storage space by reducing data size during low-motion periods), a resource constraint (e.g., associated with reducing computational demands by replacing delta frames with skip frames), and/or a motion detection condition (e.g., associated with optimizing static scenes by using skip frames during periods of no, or minimal, motion), among other examples.

As shown in FIG. 1C, the video encoder 105 may determine, based on the instruction, a temporal layer in which the skip frame is to be encoded (e.g., the video encoder may determine that the skip frame is to be encoded in a first temporal layer). As further shown in FIG. 1C, the video encoder 105 may determine a temporal layer in which an immediately preceding frame to the skip frame is encoded, or is to be encoded (e.g., a second temporal layer).

As further shown in FIG. 1C, the video encoder 105 may evaluate (e.g., based on the display order) whether the temporal layer in which the immediately preceding frame is encoded, or is to be encoded (e.g., the second temporal layer), is finer than the temporal layer in which the skip frame is to be encoded (e.g., the first temporal layer). As further shown in FIG. 1C, the video encoder 105 may perform an action (e.g., a first action or a second action, among other examples) based on the evaluation, as described in more detail elsewhere herein.

As an example, and based on the temporal layer in which the immediately preceding frame (e.g., to the skip frame) is encoded, or is to be encoded, being finer than the temporal layer in which the skip frame is to be encoded, the video encoder 105 may modify the predetermined structure by encoding the immediately preceding frame as a new delta frame in a temporal layer that is at least as coarse as the temporal layer in which the skip frame is to be encoded and may encode the skip frame with reference to the new delta frame (e.g., in the temporal layer that is at least as coarse as the temporal layer in which the skip frame is to be encoded).

As another example, and based on the temporal layer in which the immediately preceding frame (e.g., to the skip frame) is encoded, or is to be encoded, not being finer than the temporal layer in which the skip frame is to be encoded, the device may encode the skip frame with reference to the immediately preceding frame to the skip frame, which is located in a temporal layer that is at least as coarse as the temporal layer in which the skip frame is encoded (e.g., without deviating from the predetermined structure).

Figure 1D:
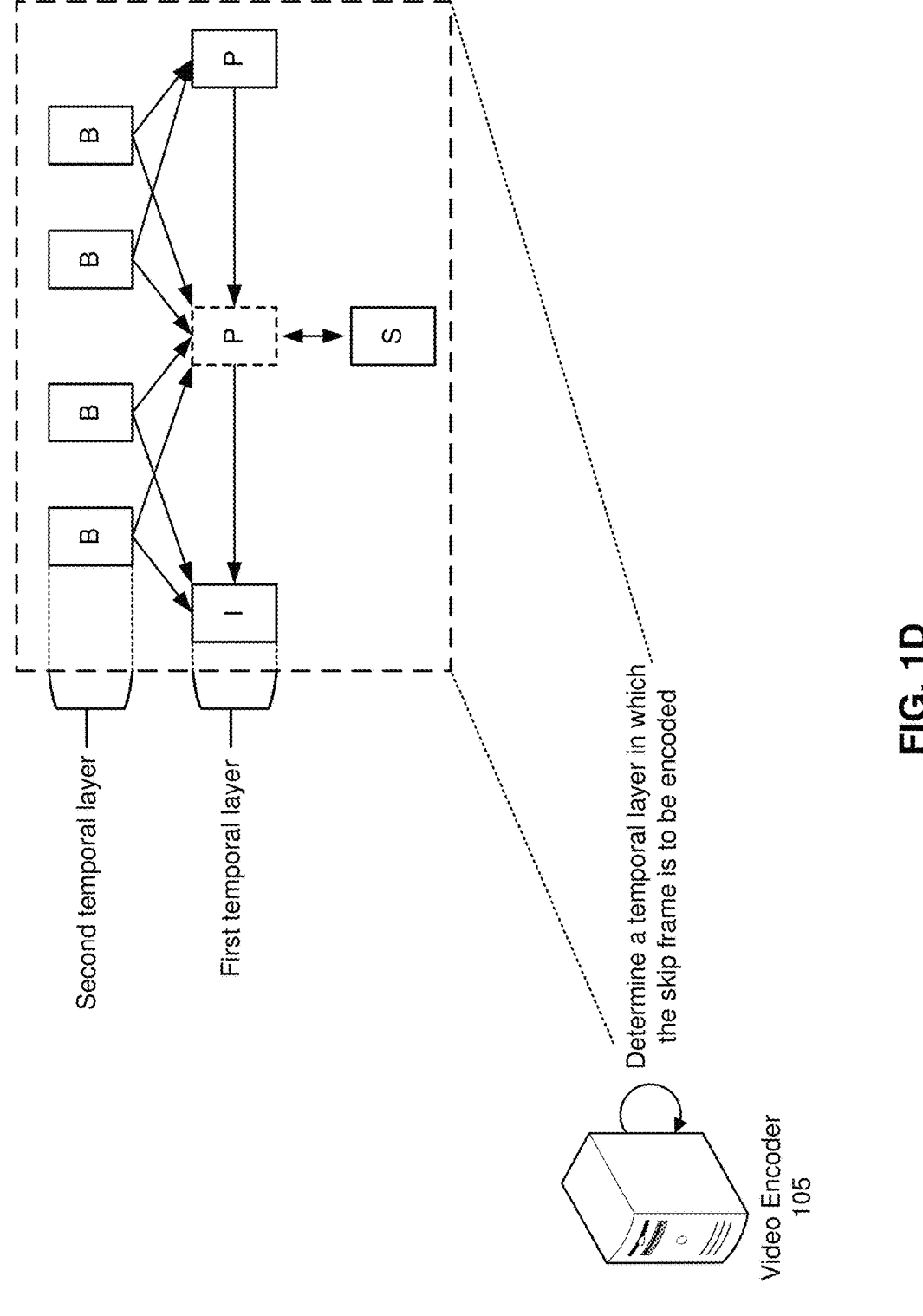

In some implementations, the instruction to encode the delta frame as the skip frame may indicate that the delta frame to be encoded as the skip frame is a pre-planned delta frame (e.g., as shown in FIG. 1D, the delta frame to be encoded as the skip frame is a P-frame, shown as a dashed box, included in an IBBPBBP structure having a first temporal layer and a second temporal layer). As further shown in FIG. 1D, the video encoder 105 may determine a temporal layer in which the skip frame is to be encoded is the first temporal layer, which is the temporal layer location of the P-frame that is to be replaced with the skip frame).

Figure 1E:
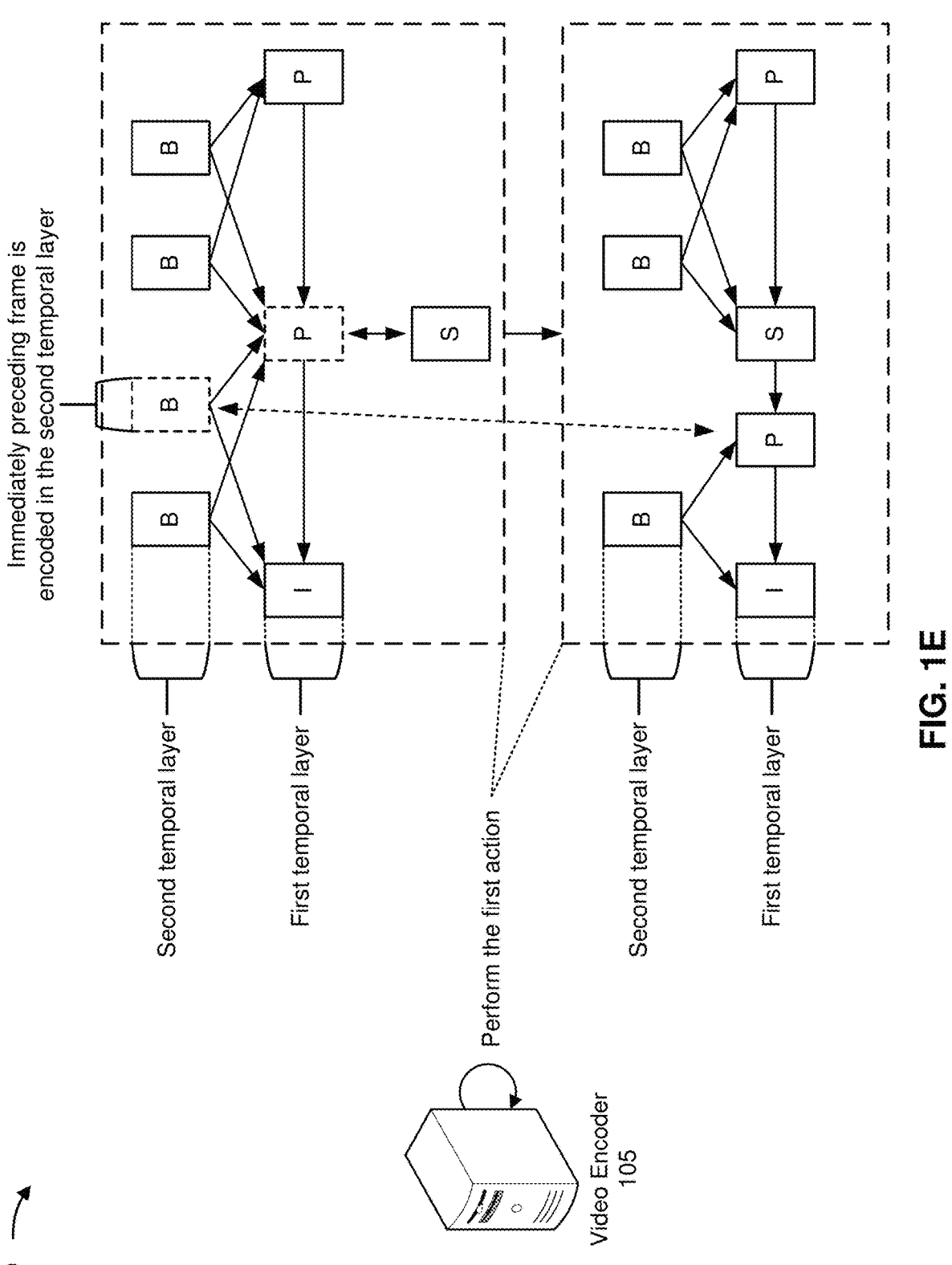

As shown in FIG. 1E, the video encoder 105 may determine that the immediately preceding frame to the skip frame is a B-frame encoded in the second temporal layer. Based on the B-frame being located in the second temporal layer (e.g., which is finer than the temporal layer in which the skip frame is to be encoded), the video encoder 105 may perform a first action. As an example, the video encoder 105 may modify the predetermined structure by encoding the B-frame as a new delta frame in the first temporal layer (e.g., shown as a new P-frame in the first temporal layer in FIG. 1E) and encoding the skip frame with reference to the new delta frame in the first temporal layer. Although the video encoder 105 is shown and described as performing the first action in association with the IBBPBBP structure, the video encoder 105 may perform the first action in association with any suitable structure.

Figure 1F:
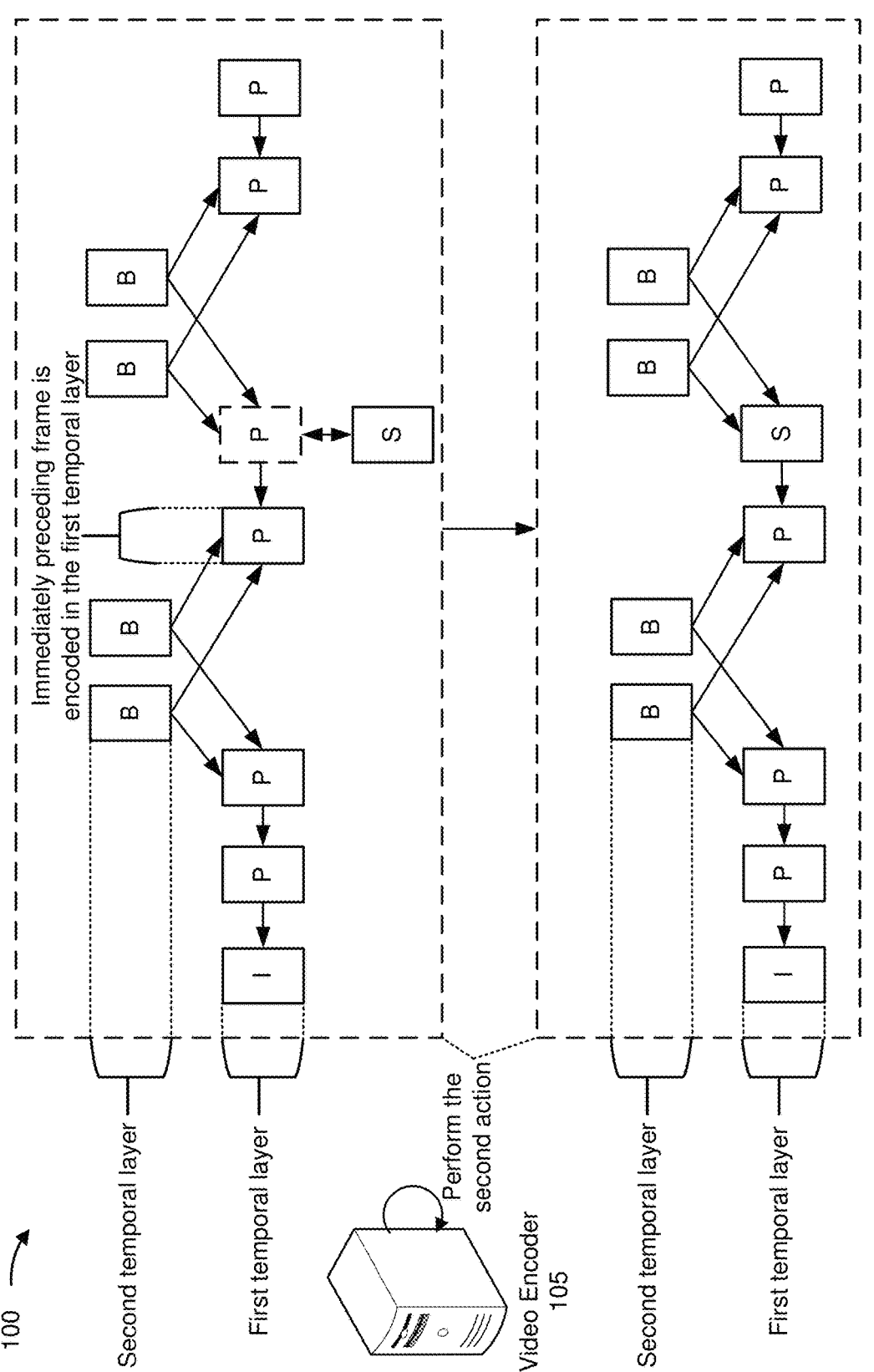

In some implementations, the instruction to encode the delta frame as the skip frame may indicate that the delta frame to be encoded as the skip frame is a pre-planned delta frame (e.g., as shown in FIG. 1F, the delta frame to be encoded as the skip frame is a P-frame, shown as a dashed box, included in an IPPBBPPBBPP structure having a first temporal layer and a second temporal layer). As further shown in FIG. 1F, the video encoder 105 may determine that the immediately preceding frame to the skip frame is a P-frame encoded in the first temporal layer. Based on the P-frame being located in the first temporal layer (e.g., which is not finer than the temporal layer in which the skip frame is to be encoded), the video encoder 105 may perform a second action. As an example, the video encoder 105 may encode the skip frame with reference to the P-frame (e.g., without deviating from the IPPBBPPBBPP structure). Although the video encoder 105 is shown and described as performing the second action in association with the IPPBBPPBBPP structure, the video encoder 105 may perform the second action in association with any suitable structure, such as a dynamic structure that varies between BBP and PPP (e.g., a dynamic IPPPBBP structure), where the fourth delta frame (e.g., the third P-frame) is a candidate for replacement via the skip frame.

Figure 1G:
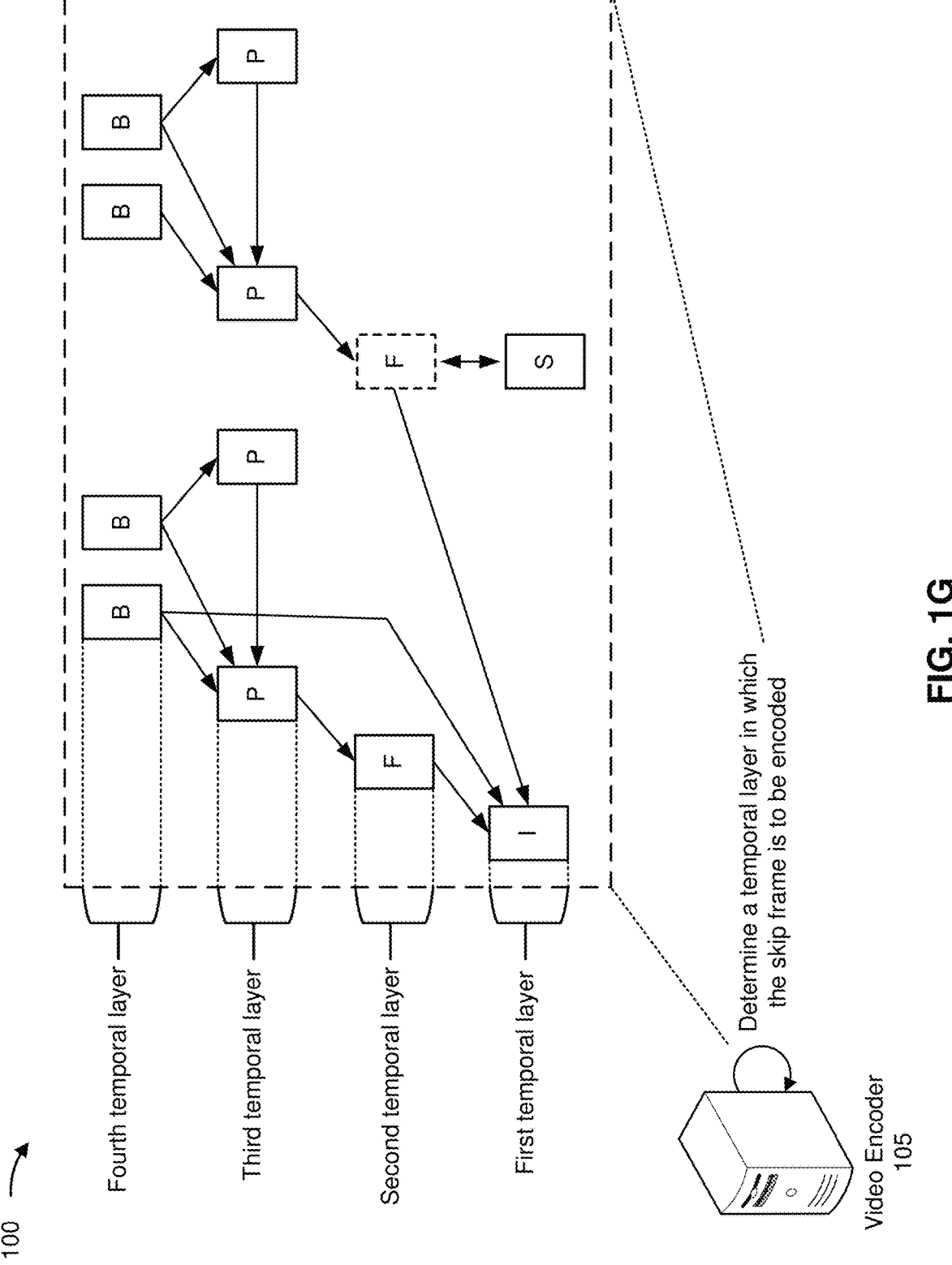

In some implementations, the instruction to encode the delta frame as the skip frame may indicate that the delta frame to be encoded as the skip frame is an F-frame (e.g., as shown in FIG. 1G, the delta frame to be encoded as the skip frame is an F-frame included in an IFPBBPFPBBP structure having a first temporal layer, a second temporal layer, a third temporal layer, and a fourth temporal layer). As further shown in FIG. 1G, the F-frame refers to the I-frame. Accordingly, if the F-frame is encoded as the skip frame, an appearance of a jump back in time to the I-frame will occur.

To prevent this jump back in time from occurring, the video encoder 105 may create an additional delta frame (e.g., in response to the instruction to encode the F-frame as the skip frame), encode the additional delta frame such that the additional delta frame is an immediately preceding frame to the F-frame, and replace the additional delta frame with a skip frame, as described in more detail elsewhere herein.

Figure 1H:
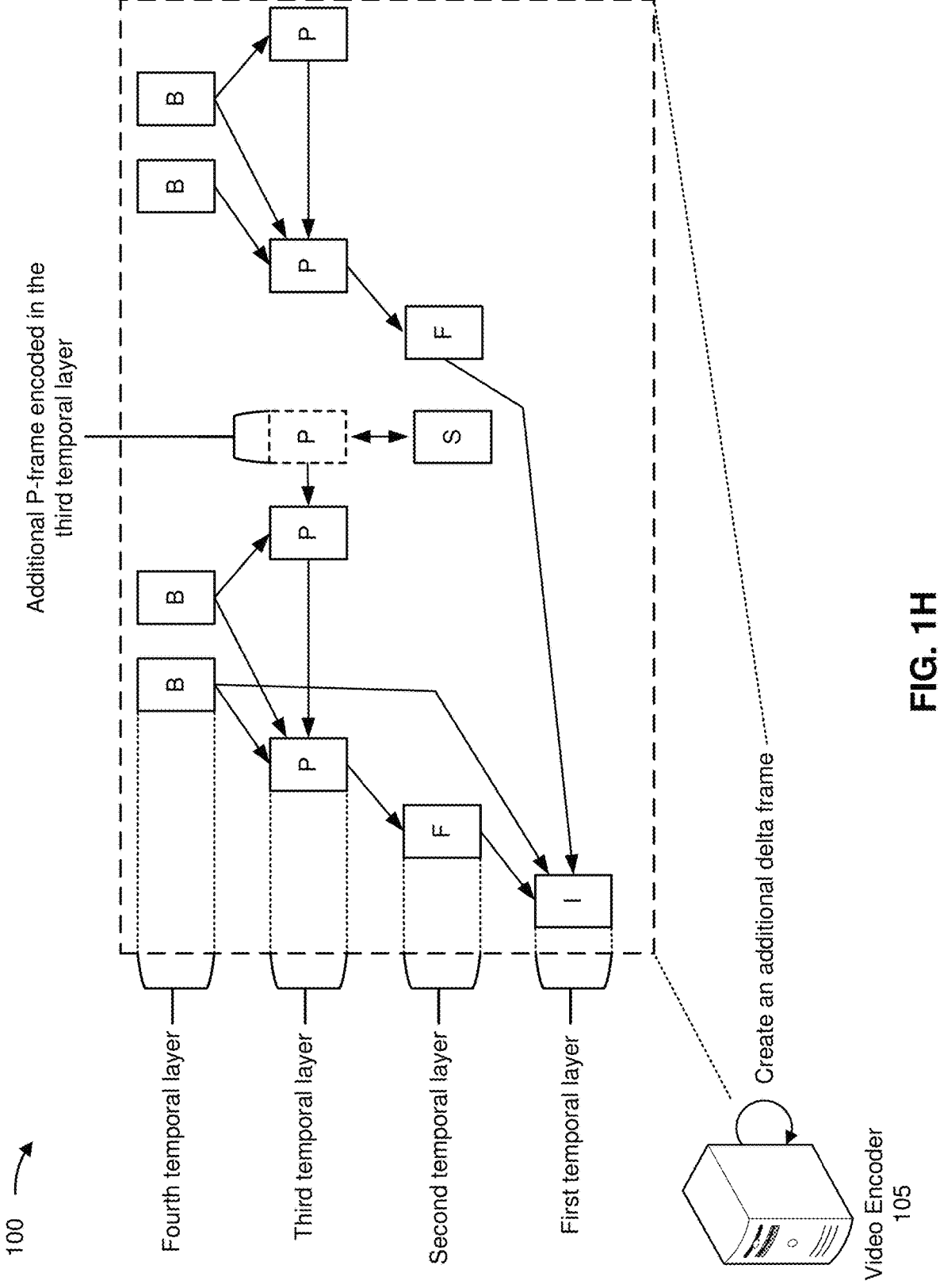

As shown in FIG. 1H, the video encoder may create an additional P-frame. The video encoder 105 may encode the additional P-frame such that the additional P-frame is an immediately preceding frame to the F-frame. The video encoder 105 may determine a temporal layer in which an immediately preceding frame to the additional delta frame is encoded or is to be encoded. For example, and as shown in FIG. 1H, the video encoder 105 may determine that the immediately preceding frame to the additional P-frame is a P-frame located in the third temporal layer.

The video encoder 105 may evaluate, based on the display order, whether the temporal layer in which the immediately preceding frame (e.g., to the additional delta frame, which is to be replaced with the skip frame) is encoded, or is to be encoded, is finer than the temporal layer in which the skip frame is to be encoded. As further shown in FIG. 1H, the immediately preceding P-frame to the additional P-frame are both located in the third temporal layer (e.g., the temporal layer in which the immediately preceding P-frame and the additional P-frame are a same coarseness).

Figure 1I:
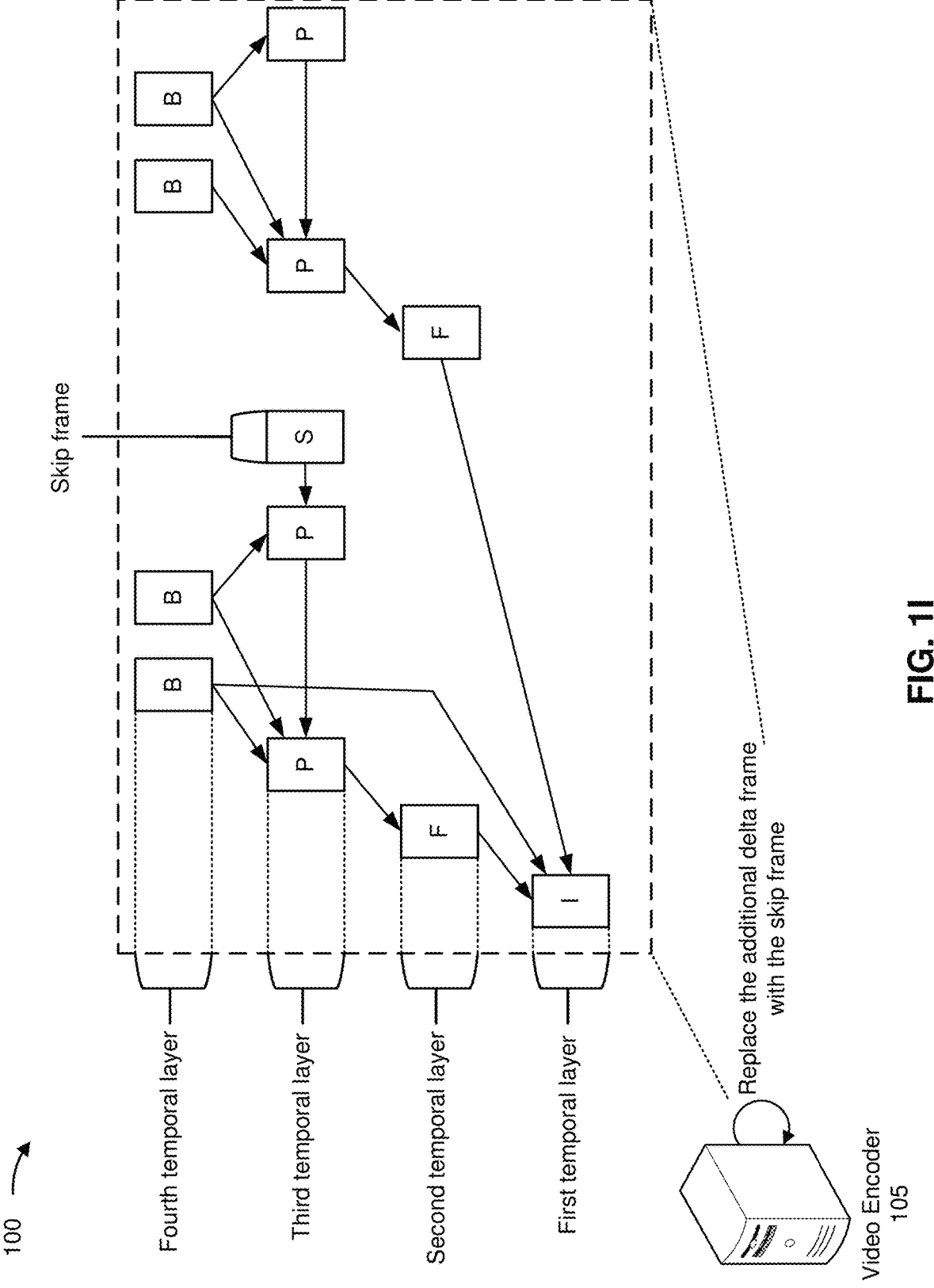

The device may perform an action based on the evaluation, as described in more detail elsewhere herein. As shown in FIG. 1I, and because the temporal layer in which the immediately preceding P-frame (e.g., to the additional P-frame) is encoded is not finer than the temporal layer in which the additional P-frame is encoded, the video encoder 105 may perform the first action (e.g., the video encoder 105 may encode the additional P-frame as the skip frame with reference to the immediately preceding P-frame). As further shown in FIG. 1I, the F-frame originally indicated to be encoded as the skip frame refers to the I-frame (e.g., after the skip frame has been added). If the temporal layer in which the immediately preceding P-frame (e.g., to the additional P-frame) is encoded is finer than the temporal layer in which the additional P-frame is encoded, the video encoder 105 may modify the predetermined structure by encoding the immediately preceding P-frame as a new delta frame in a temporal layer that is at least as coarse as the temporal layer in which the additional delta frame is encoded and may encode the additional delta frame as the skip frame with reference to the new delta frame, as described in more detail elsewhere herein.

Accordingly, the video encoder 105, which may be used to encode video data according to a hierarchical prediction pattern having multiple temporal layers and a predetermined structure (e.g., an IPBBPBBP structure, among other examples), may deviate from the predetermined structure if an immediately preceding frame to a skip frame to be encoded is encoded in a finer temporal layer than a temporal layer in which the skip frame is to be encoded. Additionally, if the immediately preceding frame to the skip frame to be encoded is encoded in a temporal layer that is at least as coarse as a temporal layer in which the skip frame is to be encoded, the video encoder 105 may perform encoding according to the predetermined structure. In this way, the video encoder 105 may replace delta frames with skip frames to lower a bit rate of an encoded video stream without affecting an FPS value of the encoded video stream and without creating jump back occurrences.

As indicated above, FIGS. 1A-1I are provided as an example. Other examples may differ from what is described with regard to FIGS. 1A-1I.

Figure 2:
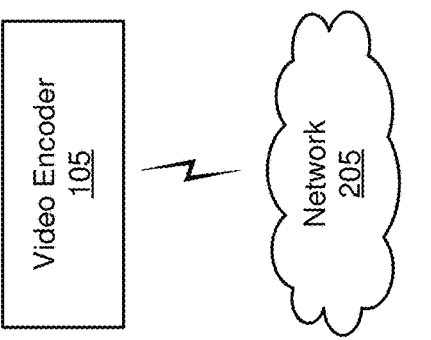
FIG. 2 is a diagram of an example environment in which systems and/or methods described herein may be implemented.

FIG. 2 is a diagram of an example environment 200 in which systems and/or methods described herein may be implemented. As shown in FIG. 2, the environment 200 may include the video encoder 105 and a network 205. Devices associated with the environment 200 may interconnect via wired connections, wireless connections, or a combination of wired and wireless connections.

The video encoder 105 may include one or more devices capable of receiving, generating, storing, processing, providing, and/or routing information associated with enhanced video encoding, as described elsewhere herein. The video encoder 105 may include one or more communication devices and/or computing devices. For example, the video encoder 105 may be implemented as a server, such as an application server, a client server, a web server, a database server, a host server, a proxy server, a virtual server (e.g., executing on computing hardware), and/or a server in a cloud computing system (e.g., including computing hardware used in cloud computing environments). As another example, the video encoder 105 may include devices, such as wireless communication devices, mobile phones, user equipment, laptop computers, tablet computers, desktop computers, gaming consoles, set-top boxes, or wearable communication devices (e.g., smart wristwatches, smart eyeglasses, head-mounted displays, or virtual reality headsets), among other examples.

In some implementations, the video encoder 105 may receive video data (e.g., a series of images) from a video source (e.g., an imaging sensor). In some implementations, the video encoder 105 may be included in a camera device. The video encoder 105 may encode the video data into an encoded video stream including key frames and delta frames. The video encoder 105 may use any suitable encoding techniques (e.g., H.264, H.265, and/or AV1, among other examples) to encode the video data into the encoded video stream. The video encoder 105 may be in communication with a memory. The memory may be used as a buffer memory during the encoding of the video data. The memory may include one or more memory portions. A specific memory portion may be a volatile memory portion, while another specific memory portion may be non-volatile. Hence, the memory may include both volatile and non-volatile memory portions.

The network 205 may include one or more wired and/or wireless networks. For example, the network 205 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 205 enables communication associated with the video encoder 105 of the environment 200.

The video encoder 105 and the network 210 shown in FIG. 2 are provided as an example. In practice, there may be additional devices and/or networks, fewer devices and/or networks, different devices and/or networks, or differently arranged devices and/or networks than those shown in FIG. 2. Furthermore, the single device shown in FIG. 2 may be implemented as multiple, distributed devices.

Figure 3:
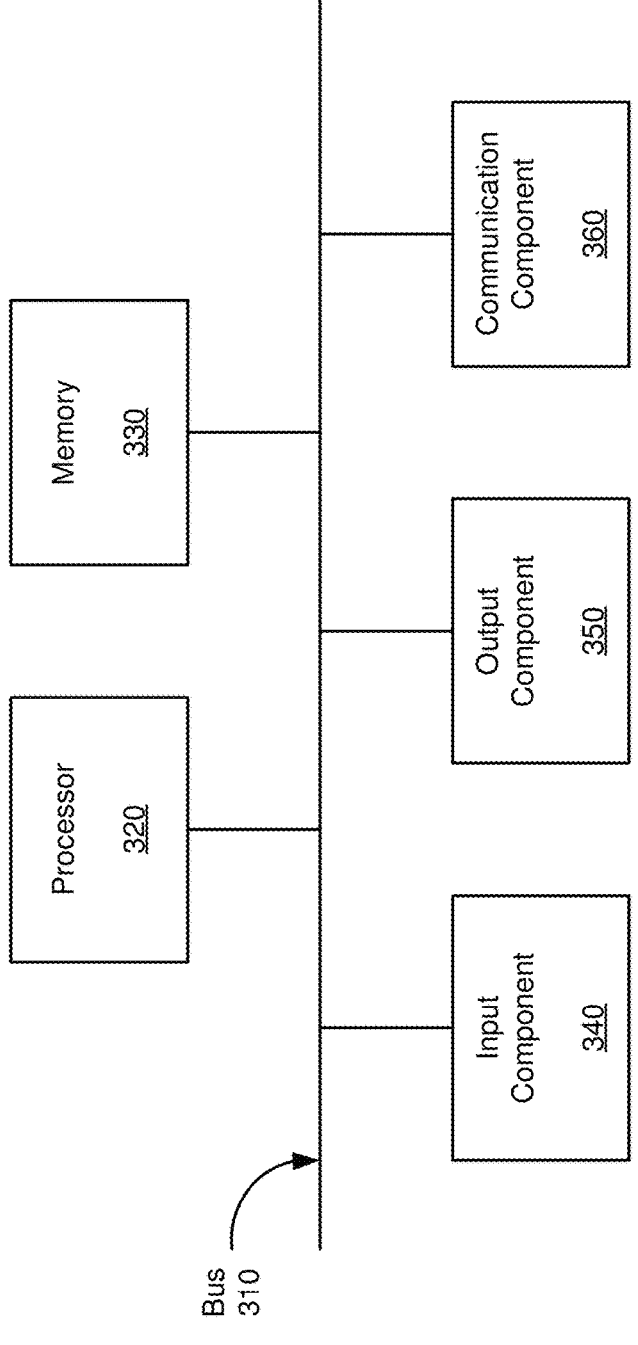
FIG. 3 is a diagram of example components of a device associated with enhanced video encoding.

FIG. 3 is a diagram of example components of a device 300 associated with enhanced video encoding. The device 300 may correspond to the video encoder 105. In some implementations, the video encoder 105 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hard-wired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

FIG. 4 is a flowchart of an example process 400 associated with enhanced video encoding. In some implementations, one or more process blocks of FIG. 4 may be performed by a video encoder (e.g., the video encoder 105). In some implementations, one or more process blocks of FIG. 4 may be performed by another device or a group of devices separate from or including the video encoder. Additionally, or alternatively, one or more process blocks of FIG. 4 may be performed by one or more components of the device 300, such as the processor 320, the memory 330, the input component 340, the output component 350, and/or the communication component 360.

As shown in FIG. 4, the process 400 may include encoding a series of images of video data into an encoded video stream including key frames and delta frames (block 410). For example, the video encoder may (e.g., using the processor 320 and/or the memory 330) encode a series of images of video data into an encoded video stream including key frames and delta frames, as described in more detail elsewhere herein. The delta frames may be arranged according to a hierarchical prediction pattern with multiple temporal layers and a predetermined structure. The hierarchical prediction pattern may define a display order.

As further shown in FIG. 4, the process 400 may include obtaining an instruction to encode a delta frame as a skip frame (block 420). For example, the video encoder may obtain an instruction to encode a delta frame as a skip frame to lower a bit rate of the encoded video stream and maintain an FPS value of the encoded video stream, as described in more detail elsewhere herein.

As further shown in FIG. 4, the process 400 may include determining a temporal layer in which the skip frame is to be encoded (block 430). For example, the video encoder may determine a temporal layer in which the skip frame is to be encoded, as described in more detail elsewhere herein. As an example, the video encoder may determine that the skip frame is to be encoded in a first temporal layer, of the multiple temporal layers, according to the predetermined structure.

As further shown in FIG. 4, the process 400 may include evaluate whether the temporal layer in which the immediately preceding frame to the skip frame is encoded, or is to be encoded (e.g., the second temporal layer), is finer than the temporal layer in which the skip frame is to be encoded (e.g., the first temporal layer). For example, the video encoder may determine a temporal layer in which an immediately preceding frame to the skip frame is encoded, or is to be encoded (e.g., a second temporal layer). The video encoder may evaluate (e.g., based on the display order) whether the temporal layer in which the immediately preceding frame is encoded, or is to be encoded (e.g., the second temporal layer), is finer than the temporal layer in which the skip frame is to be encoded (e.g., the first temporal layer).

As further shown in FIG. 4, the process 400 may include performing an action based on the evaluation (block 450). As an example, and based on the second temporal layer being finer than the first temporal layer, the video encoder may modify the predetermined structure by encoding the immediately preceding frame as a new delta frame in the first temporal layer and encoding the skip frame with reference to the new delta frame in the first temporal layer, as described in more detail elsewhere herein. As another example, and based on the second temporal layer not being finer than the first temporal layer, the video encoder may encode the skip frame with reference to the immediately preceding frame (e.g., without deviating from the predetermined structure), as described in more detail elsewhere herein.

In some implementations, the instruction may be associated with a decoding requirement of maintaining a fixed frame display interval. In some implementations, the predetermined structure may be a group of pictures (GOP) structure that utilizes at least one of a dyadic prediction structure, a non-dyadic prediction structure, or a hierarchical prediction structure with a zero encoder/decoder delay.

In some implementations, the delta frame encoded as the skip frame may be at least one of a P-frame or a B-frame. In some implementations, the immediately preceding frame may be at least one of a p-frame or B-frame.

In some implementations, the new delta frame may reference at least one of a preceding key frame or a preceding delta frame. In some implementations, the instruction may be associated with at least one of an available bandwidth, a network condition, an available storage capacity, a resource constraint, or a motion detection condition.

Although FIG. 4 shows example blocks of the process 400, in some implementations, the process 400 may include additional blocks, fewer blocks, different blocks, or differently arranged blocks than those depicted in FIG. 4. Additionally, or alternatively, two or more of the blocks of the process 400 may be performed in parallel. The process 400 is an example of one process that may be performed by one or more devices described herein. These one or more devices may perform one or more other processes based on operations described herein, such as the operations described in connection with FIGS. 1A-1I. Moreover, while the process 400 has been described in relation to the devices and components of the preceding figures, the process 400 may be performed using alternative, additional, or fewer devices and/or components. Thus, the process 400 is not limited to being performed with the example devices, components, hardware, and software explicitly enumerated in the preceding figures.

The foregoing disclosure provides illustration and description but is not intended to be exhaustive or to limit the implementations to the precise forms disclosed. Modifications may be made in light of the above disclosure or may be acquired from practice of the implementations.

As used herein, the term "component" is intended to be broadly construed as hardware, software, and/or a combination of hardware and software. It will be apparent that systems and/or methods described herein may be implemented in different forms of hardware, software, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware may be used to implement the systems and/or methods based on the description herein.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a-b, a-c, b-c, and a-b-c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a-b, a-c, b-c, and a-b-c.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A video encoding method, comprising:
   encoding a series of images of video data into an encoded video stream including key frames and delta frames,
      wherein the delta frames are arranged according to a hierarchical prediction pattern with multiple temporal layers and a predetermined structure, and wherein the hierarchical prediction pattern defines a display order for the key frames and delta frames;

obtaining an instruction to encode a delta frame as a skip frame to lower a bit rate of the encoded video stream and maintain a frames per second (FPS) value of the encoded video stream;

determining that the skip frame is to be encoded in a first temporal layer, of the multiple temporal layers, according to the predetermined structure;

evaluating, based on the display order, whether an immediately preceding frame to the skip frame is encoded, or to be encoded, in a second temporal layer, of the multiple temporal layers, that is finer than the first temporal layer;

based on the second temporal layer being finer than the first temporal layer, modifying the predetermined structure by encoding the immediately preceding frame as a new delta frame in the first temporal layer, and encoding the skip frame with reference to the new delta frame in the first temporal layer; and based on the second temporal layer not being finer than the first temporal layer, encoding the skip frame with reference to the immediately preceding frame.

2. The video encoding method of claim 1, wherein the instruction is associated with a decoding requirement of maintaining a fixed frame display interval.

3. The video encoding method of claim 1, wherein the predetermined structure is a group of pictures (GOP) structure that utilizes at least one of:

a dyadic prediction structure, a non-dyadic prediction structure, or a hierarchical prediction structure with a zero encoder/decoder delay.

4. The video encoding method of claim 1, wherein the delta frame encoded as the skip frame is at least one of:

a predictive frame (P-frame), or a bi-predictive frame (B-frame).

5. The video encoding method of claim 1, wherein the immediately preceding frame is at least one of:

a predictive frame (P-frame), or a bi-predictive frame (B-frame).

6. The video encoding method of claim 1, wherein the new delta frame references at least one of:

a preceding key frame, or a preceding delta frame.

7. The video encoding method of claim 1, wherein the instruction is associated with at least one of:

an available bandwidth, a network condition, an available storage capacity, a resource constraint, or motion detection condition.

8. A device, comprising:

one or more memories; and one or more processors, communicably coupled to the one or more memories, configured to:

encode a series of images of video data into an encoded video stream including key frames and delta frames, wherein the delta frames are arranged according to a hierarchical prediction pattern with multiple temporal layers and a predetermined structure, and wherein the hierarchical prediction pattern defines a display order for the key frames and delta frames;

obtain an instruction to encode a delta frame as a skip frame to lower a bit rate of the encoded video stream and maintain a frames per second (FPS) value of the encoded video stream;

determine that the skip frame is to be encoded in a first temporal layer, of the multiple temporal layers, according to the predetermined structure;

evaluate, based on the display order, whether an immediately preceding frame to the skip frame is encoded, or to be encoded, in a second temporal layer, of the multiple temporal layers, that is finer than the first temporal layer;

based on the second temporal layer being finer than the first temporal layer, modify the predetermined structure by encoding the immediately preceding frame as a new delta frame in the first temporal layer, and encode the skip frame with reference to the new delta frame in the first temporal layer; and based on the second temporal layer not being finer than the first temporal layer, encode the skip frame with reference to the immediately preceding frame.

9. The device of claim 8, wherein the instruction is associated with a decoding requirement of maintaining a fixed frame display interval.

10. The device of claim 8, wherein the predetermined structure is a group of pictures (GOP) structure that utilizes at least one of:

a dyadic prediction structure, a non-dyadic prediction structure, or a hierarchical prediction structure with a zero encoder/decoder delay.

11. The device of claim 8, wherein the delta frame encoded as the skip frame is at least one of:

a predictive frame (P-frame), or a bi-predictive frame (B-frame).

12. The device of claim 8, wherein the immediately preceding frame is at least one of:

a predictive frame (P-frame), or a bi-predictive frame (B-frame).

13. The device of claim 8, wherein the new delta frame references at least one of:

a preceding key frame, or a preceding delta frame.

14. The device of claim 8, wherein the instruction is associated with an operational requirement related to at least one of:

an available bandwidth, a network condition, an available storage capacity, a resource constraint, or a motion detection condition.

15. A non-transitory computer-readable medium storing a set of instructions, the set of instructions comprising:

one or more instructions that, when executed by one or more processors of a device, cause the device to:

encode a series of images of video data into an encoded video stream including key frames and delta frames, wherein the delta frames are arranged according to a hierarchical prediction pattern with multiple temporal layers and a predetermined structure, and wherein the hierarchical prediction pattern defines a display order for the key frames and delta frames;

obtain an instruction to encode a delta frame as a skip frame to lower a bit rate of the encoded video stream and maintain a frames per second (FPS) value of the encoded video stream;

determine that the skip frame is to be encoded in a first temporal layer, of the multiple temporal layers, according to the predetermined structure;

evaluate, based on the display order, whether an immediately preceding frame to the skip frame is encoded, or to be encoded, in a second temporal layer, of the multiple temporal layers, that is finer than the first temporal layer;

based on the second temporal layer being finer than the first temporal layer, modify the predetermined structure by encoding the immediately preceding frame as a new delta frame in the first temporal layer, and encode the skip frame with reference to the new delta frame in the first temporal layer; and based on the second temporal layer not being finer than the first temporal layer, encode the skip frame with reference to the immediately preceding frame.

16. The non-transitory computer-readable medium of claim 15, wherein the instruction is associated with a decoding requirement of maintaining a fixed frame display interval.

17. The non-transitory computer-readable medium of claim 15, wherein the predetermined structure is a group of pictures (GOP) structure that utilizes at least one of:

a dyadic prediction structure, a non-dyadic prediction structure, or a hierarchical prediction structure with a zero encoder/decoder delay.

18. The non-transitory computer-readable medium of claim 15, wherein the delta frame encoded as the skip frame is at least one of:

a predictive frame (P-frame), or a bi-predictive frame (B-frame).

19. The non-transitory computer-readable medium of claim 15, wherein the immediately preceding frame is at least one of:

a predictive frame (P-frame), or a bi-predictive frame (B-frame).

20. The non-transitory computer-readable medium of claim 15, wherein the new delta frame references at least one of:

a preceding key frame, or a preceding delta frame.

* * * * *